No. 710,806. Patented Oct. 7, 1902.
C. RÜBSAM.
CANDLE MOLDING MACHINE.
(Application filed Oct. 22, 1901.)
(No Model.) 3 Sheets—Sheet 3.
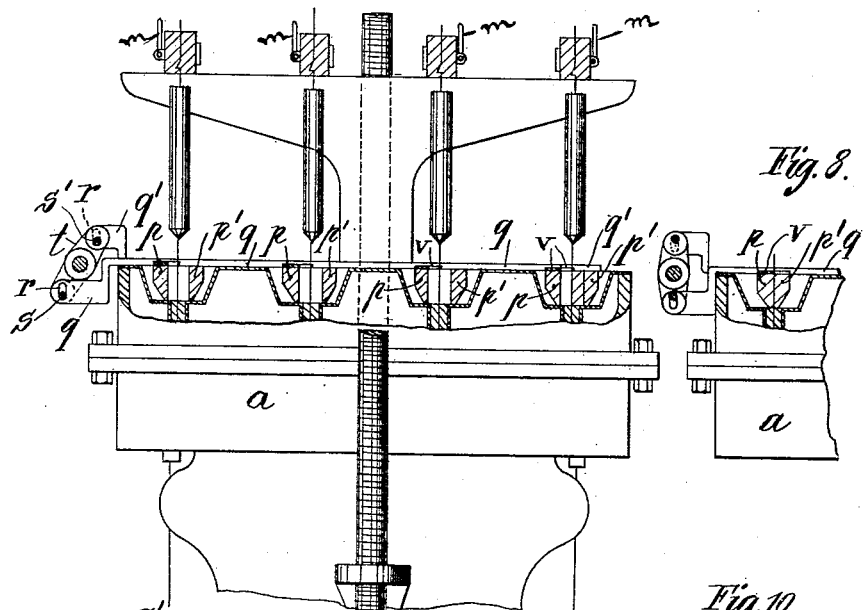
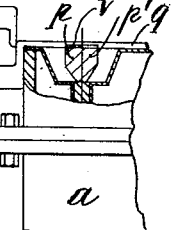
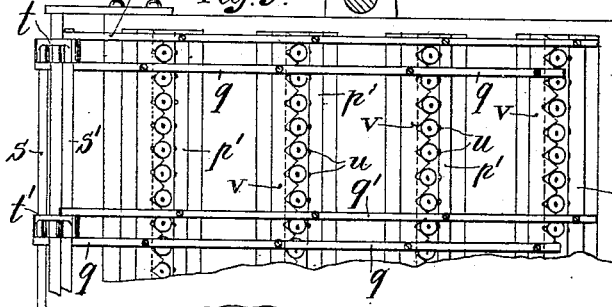
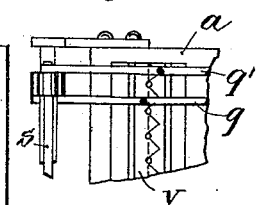
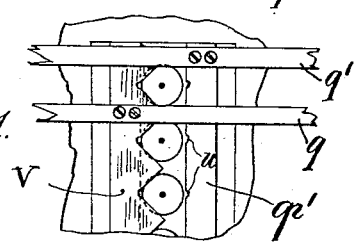
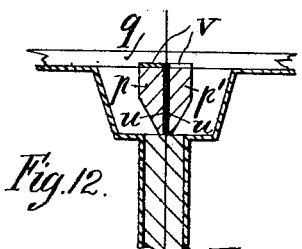
Witnesses.
Hans Brunner
Willi Kasper
Inventor.
Carl Rübsam
per Gerson Jacks
Attorneys.

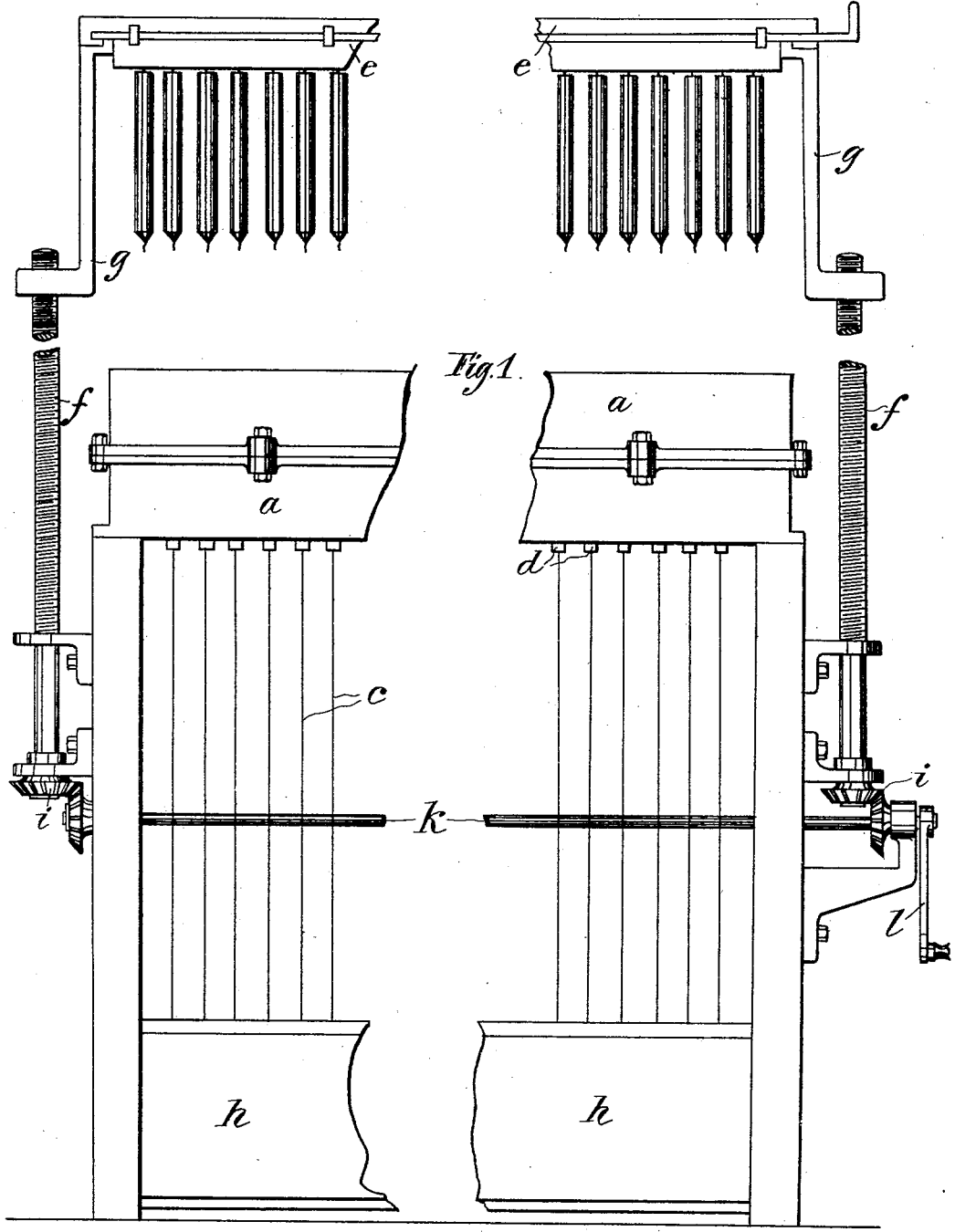

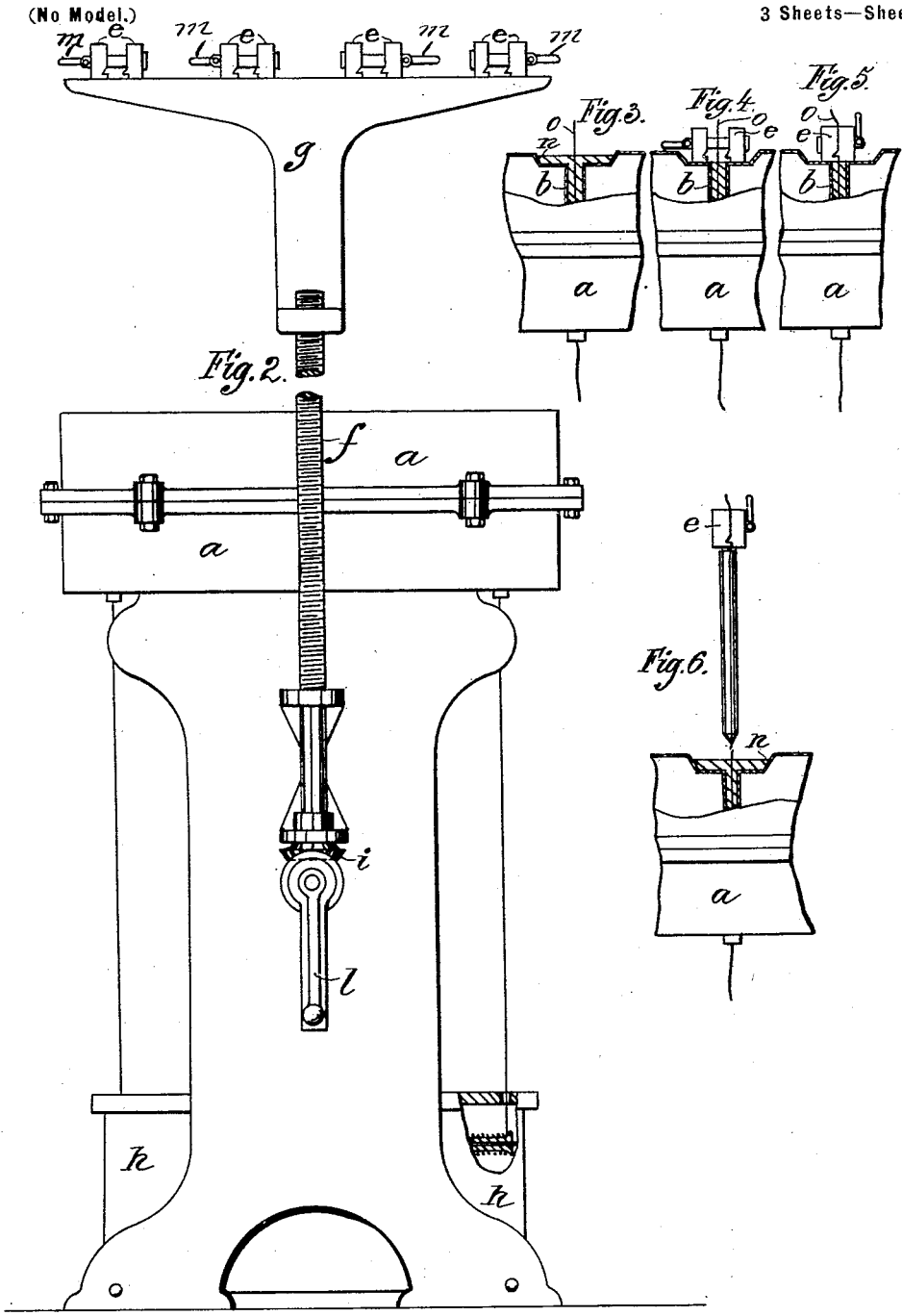

UNITED STATES PATENT OFFICE.

CARL RÜBSAM, OF FULDA, GERMANY.

CANDLE-MOLDING MACHINE.

SPECIFICATION forming part of Letters Patent No. 710,806, dated October 7, 1902.

Application filed October 22, 1901. Serial No. 79,577. (No model.)

*To all whom it may concern:*

Be it known that I, CARL RÜBSAM, a subject of the Emperor of Germany, and a resident of Fulda, German Empire, have invented a new and useful Candle-Molding Machine, of which the following is a specification.

The present invention relates to candle-molding machines; and it consists in the particular means for guiding and centering the wick-cords.

In the accompanying drawings, in which similar letters of reference refer throughout to similar parts, Figure 1 is a front elevation of a machine embodying the present invention. Fig. 2 is an end view of Fig. 1. Figs. 3 to 6, inclusive, illustrate certain details hereinafter fully described. Figs. 7 and 8 illustrate a modification of the machine, partly in cross-section. Figs. 9 and 10 are plan views of the machine shown in Figs. 7 and 8. Figs. 11 and 12 are a plan view and a cross-section of a detail.

In the construction of a machine after the present invention a casing $a$ is employed, mounted on suitable stands and provided with a plurality of molds $b$, arranged in series. Grooves $n$ are formed connecting the upper ends of the molds of each series, so that an equal distribution of the mass can be easily obtained. This casing forms a suitable water-tight jacket, in which water is placed for the purpose of causing the mass to more quickly "set" or cool. The bottom of each mold is provided with a suitable plug $d$, provided in the center with a vertical opening of a size corresponding to that of the wick employed. Mounted between the frames and below said casing is a shaft $k$, on both ends of which bevel-wheels are secured. Said bevels mesh with others, $i$, mounted on the lower ends of two vertically-journaled screw-spindles $ff$. A crank $l$, fastened to one end of said shaft, affords means for easily rotating the same. A clamping or hoisting frame is mounted above said casing $a$ and consists of a plurality of irons $e$, placed in pairs, one iron of each pair being stationarily fastened at each end to a wing $g$, provided with a threaded ear, through which latter the screw-spindle $f$ on that end of the machine passes. The remaining iron of each pair is allowed a limited lateral motion and may be tightly clamped against its mate by means of crank-levers, as $m$, or any other suitable device. A wick-box $h$ is mounted between the frames of the machine and preferably below and parallel to said shaft $k$. The said clamping-irons have their coacting adjacent faces corrugated and the like for the purpose of more firmly grasping the wick end.

The operation of the invention will be clearly understood from the foregoing description and accompanying drawings when taken in connection with the following statement: The clamping-frame is raised so that the molds are free. The wick-cords, one to each mold, are then passed through said plugs $d$ and their upper ends fastened between the clamping-irons which ride just free of the molds. The mass is then poured into the forms, setting quickly under the influence of the cool water. (See Fig. 3.) Now the wicks are freed from strain by opening the clamp-irons, and the cake or residue of the mass in the groove $n$ is removed by means of a suitable knife having the middle of its edge blunt for preventing injury to the wicks. The clamping device is now lowered until it reaches the bottom of groove $n$, and the wick ends are fastened between the irons $e\ e$. (See Figs. 4 and 5.) Now the clamping-frame is raised by revolving crank $l$, and consequently the screws $ff$. In thus raising the clamping-frame the candles are drawn from their forms by their own wicks and do not have to be pushed up by some other means. The frame is thus raised until the lower ends of the candles clear the mold-bed, whence it is held while a second set of candles are formed. (See Fig. 6.) Then the wicks are cut through below the hanging set, which is raised, as shown in Fig. 1, and laid aside into a suitable box shifted therebelow. Now the operation is repeated, as above described. By this machine it will be thus seen that the candles are easily formed and quickly drawn out of their molds without the employment of unnecessary devices, as pistons or the like, but by a part of themselves—*i. e.*, their wicks.

The object of the modification of the said machine (illustrated in Figs. 7 to 12) is to provide means for guiding the wicks centrally immediately above the molds when the candles being drawn upwardly have cleared the mold-bed and a second set of candles shall be formed. In this construction I use a pair of irons $p$ and $p'$, mounted within each of the grooves $n$ and respectively fastened to cross-bars $q$ and $q'$, which are slidingly mounted on the surface of said casing $a$ and are respectively connected by slotted eyes $r$ to rods $s\ s'$, which latter connect the ends of two or more double-armed levers $t\ t'$, which are mounted in bearings, as shown, at one side of the casing $a$. By this manner of construction the irons $p\ p'$ may be moved parallelly to each other. When the said irons are tightly forced together, their adjacent surfaces lie centrally above the series of molds therebelow, and half-round vertical grooves $u$, oppositely arranged in the adjacent surfaces of the said irons, form a guide for each wick as the said grooves when the pair of irons is thus closed lie centrally above each mold. Mounted on each iron $p$, between the cross-bars $q\ q'$, is a toothed or serrated flat iron plate $v$, which has its teeth formed between each adjacent pair of the said vertical grooves $u$, and thus forms a means for preventing a wick from being clamped between the said irons when the said wick is not hanging centrally within the mold. The grooves $u$ in the iron $p$, as clearly shown in Fig. 11, form the bottom between two teeth of the above-mentioned flat iron plate $v$. Therefore the wicks are pushed into said grooves $u$ when the iron $p'$ is moved against its mate, as will be clearly understood. The operation of the machine with this modified construction is obvious. The irons $p\ p'$ are forced tightly against each other and the wick-cords passed therethrough are fastened thereabove. Then the mass is poured into the molds, entering on both sides of the said guide-irons, which have their outer and lower edges beveled for this purpose. When the said mass has cooled, the mass in the grooves $n$ is removed and the clamping device is lowered for grasping the wick ends extending above the guide $p\ p'$, which is then opened for allowing the clamping-frame to be raised with the candles, as above described. When the candles have cleared the mold, the guide $p\ p'$ is again closed and the operation repeated, as above described.

Having now described my invention, what I claim as new, and desire to protect by Letters Patent, is—

In a candle-molding machine the combination of a water-tight cooling-casing provided with a plurality of molds or forms arranged in series, perforated plugs in the lower ends of each of said molds, two parallelly-movable irons centrally above each of said mold series, vertical half-round grooves oppositely arranged in the adjacent surfaces of the said irons and forming a wick-guide centrally above the molds when forced against each other, a toothed or serrated plate on one of said two movable irons for forcing the wick into said grooves, vertical screws, gearing for operating the same, a clamping-frame vertically movable on said screws, a plurality of clamping-irons on said frame consisting each of one stationary and one laterally-movable iron, means for tightly forcing the said clamping-irons together and holding the upper ends of wicks passing through said forms with their candles for the purpose of lifting said candles, substantially as described.

CARL RÜBSAM.

Witnesses:
  JEAN GRUND,
  CARL GRUND.